(12) United States Patent
Noonan et al.

(10) Patent No.: US 6,857,040 B2
(45) Date of Patent: Feb. 15, 2005

(54) BI-DIRECTIONAL BUS BRIDGE IN WHICH MULTIPLE DEVICES CAN ASSERT BUS CONCURRENTLY

(75) Inventors: Robert L. Noonan, Crystal Lake, IL (US); Theodore F. Emerson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 10/006,878

(22) Filed: Dec. 5, 2001

(65) Prior Publication Data

US 2003/0105910 A1 Jun. 5, 2003

(51) Int. Cl.[7] .............................................. G06F 13/00
(52) U.S. Cl. ....................................................... 710/306
(58) Field of Search ................................ 710/306, 307, 710/308, 309, 310, 311, 312, 313, 314, 315

(56) References Cited

U.S. PATENT DOCUMENTS

| | | | | |
|---|---|---|---|---|
| 5,625,829 A | * | 4/1997 | Gephardt et al. | ........... 710/104 |
| 6,038,623 A | * | 3/2000 | Schutte | ........................ 710/100 |
| 6,145,036 A | * | 11/2000 | Barenys et al. | ............. 710/300 |
| 6,567,876 B1 | * | 5/2003 | Stufflebeam | ................ 710/303 |

OTHER PUBLICATIONS

"The I2C–Bus Specification, Version 2.1", Philips Semiconductors, Jan. 2000.*

* cited by examiner

*Primary Examiner*—Glenn A. Auve

(57) ABSTRACT

A bridge device couples together two buses in which more than one device at a time can assert a bus signal. The bridge includes comparators to drive or assert signals on one bus only if the signal is being asserted by the corresponding signal on the other of said buses. That is, the bridge does not drive a signal on a bus that is already being actively driven by a device coupled to that same bus. However, if a device coupled to the other of the buses drives the signal, then the comparator does drive the signal. The bridge preferably includes one such comparator for each bus signal on both buses. The bridge is particularly well-suited for use in bridging I$^2$C buses.

18 Claims, 3 Drawing Sheets

BI-DIRECTIONAL BUS BRIDGE IN WHICH MULTIPLE DEVICES CAN ASSERT BUS CONCURRENTLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a bus bridge. More particularly, the invention relates to a bi-directional bridge for use with buses in which multiple devices may attempt to drive the bus concurrently. More particularly still, the invention relates to an $I^2C$ bus bridge.

2. Background of the Invention

Modern computer systems generally include a plurality of devices interconnected through a system of buses. For example, a conventional computer system typically contains one or more central processing unit (CPUs) coupled through a host bridge to a main memory unit. A CPU bus usually couples the CPU(s) to the host bridge, and a memory bus connects the bridge to the main memory. The host bridge typically includes a memory controller which receives memory access requests (such as from the CPUs) and responds by generating standard control signals necessary to access the main memory.

Other types of buses may also be present in a computer system. The $I^2C$ bus developed by Philips is one such example. The $I^2C$ bus generally has a simple architecture, is easy to use and is thus becoming widely used. The $I^2C$ bus has one or more characteristics that may also be found in other buses now known or later developed. One such characteristic is that only a limited number of devices can be connected to any one bus. This limitation results from electrical loading and noise concerns. Accordingly, if the number of $I^2C$-compliant devices desired to be included in a system increases, a system designer is forced to include more than one $I^2C$ bus in the system. It is not uncommon today for a system to have multiple $I^2C$ buses with each bus having one or more devices connected thereto.

It may be desired for a device attached to one $I^2C$ bus to communicate with a device attached to another $I^2C$ bus. One way to permit this communication, albeit in a less than efficient manner, includes using the core logic of the system (e.g., the host processor) to pass information from one $I^2C$ bus to another. Another technique would be to bridge the two $I^2C$ buses together.

The bridge solution is not simple and straightforward because of another characteristic of the $I^2C$ bus in which more than one device attached to the bus may attempt to drive the bus at a time. Concurrent bus assertion is common during the $I^2C$ bus arbitration process, for example. Also, slave devices may attempt to drive a bus while a master is driving the bus in order to cause the transaction to stall for one reason or another. When a device drives the bus, the device typically pulls one of the bus signals low. Another device may drive that same signal low. Because a second device is driving the signal low, the signal will remain low even if the first device releases the signal. This is generally true because of the open-collector or open-drain nature of the $I^2C$ bus. This characteristic makes it difficult to bridge two $I^2C$ buses together.

An example will help clarify the problem. A bridge may couple together two $I^2C$ buses (designated A and B). If a master on bus A drives the clock signal low, the bridge should detect that event and drive the corresponding clock signal low on B bus. If, while the B bus clock signal is low, a device on the B bus attempts to force low that already low clock signal, the bridge will not be able to detect this occurrence because the clock signal is already low. Then, if the master on bus A that initially drove the clock signal low releases its hold of the clock signal and the bus B device is still driving bus B's clock signal low, the bridge will not know to keep the bus A clock signal low.

A solution to this problem is needed. Such a solution preferably should be inexpensive to implement.

BRIEF SUMMARY OF THE INVENTION

The problems noted above are solved in large part by a bridge device, particularly useful in computer systems, which can detect whether the same signal on two separate buses is being actively asserted by devices on both buses. The bridge preferably includes comparators to drive or assert signals on one bus only if the signal is being asserted by the corresponding signal on the other of said buses. That is, the bridge does not drive a signal on a bus that is already being actively driven by a device coupled to that very bus if the same signal is not being driven by a device on another bus connected to the bridge.

By way of example, if a device coupled to a first bus asserts a signal (e.g., low), a comparator in the bridge detects this condition and causes the corresponding signal on the second bus to be asserted. The bridge, however, does not attempt to drive the same signal on the first bus that is already being asserted. This is particularly useful in a bi-directional bus in which one or more signals can be asserted concurrently by more than one device on the bus. If devices on both buses concurrently assert the same signal to the same logic level, the bridge detects this condition. Then, if one of the devices attempts to release the signal, the bridge will continue to assert that signal on that same bus, even though the signal was released by the device on that bus, because the device on the other bus is continuing to assert the same signal.

The preferred embodiment of the bridge includes a comparator corresponding to each bus signal and for each bus. Thus, if each bus (e.g., an $I^2C$ bus) has two signals, the bridge will have four comparators—two comparators for the two signals on one bus and another pair of comparators for the corresponding two signals on the other bus. Each comparator has two inputs. One input is coupled to a threshold voltage and the other input is coupled to a bus signal from both buses. The bus signal input to the comparator will be at a voltage level that will differ depending on which bus is actively driving the signal. A resistor included in the circuit ensures that two different voltage levels will occur depending on the source of the signal. The threshold input is set at a voltage level that is between these two voltage levels of the bus signal input. Accordingly, the comparator is able to determine which bus is actively driving the signal and then only drive the bus signal on the bus to which the comparator's output is coupled if the bus signal is being actively driven by the other bus.

This type of bus bridge is elegantly simple and straightforward and works well for buses in which a signal can be concurrently asserted by more than one device. Further, the bridge can be used to bridge together two buses operating from different power planes, while maintaining each bus electrically isolated from the other bus. These and other advantages will become apparent upon reviewing the following disclosures.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. In addition, no distinction is made between a "processor," "microprocessor," "microcontroller," or "central processing unit" (CPU) for purposes of this disclosure. To the extent that any term is not specially defined in this specification, the intent is that the term is to be given its plain and ordinary meaning.

DETAILED DESCRIPTION OF THE PREFERRED EMBODIMENTS

The preferred embodiment described below is shown in the context of a bridge for coupling together two I$^2$C buses. Broadly, however, this disclosure and the claims which follow should not be limited to just the I$^2$C bus, but rather should apply to bridging other types of buses.

Figure 1:
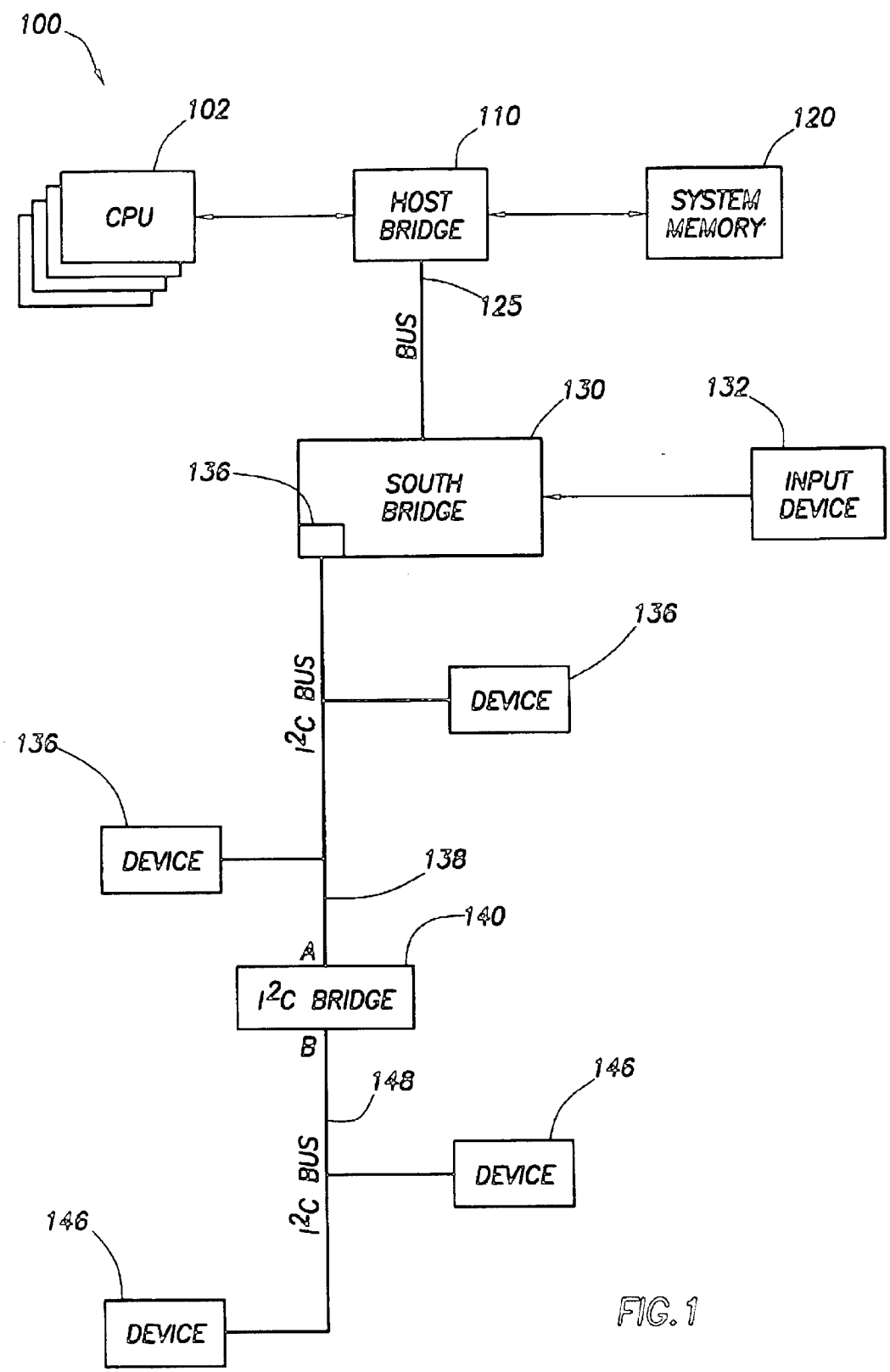
FIG. 1 shows a computer system embodying the preferred embodiment of the invention in which an I$^2$C bus bridge is included.

Referring now to FIG. 1, system 100 is shown constructed in accordance with a preferred embodiment of the invention. As shown, system 100 includes one or more host processors 102, a host bridge 110, system memory 120, a south bridge 130, an input device 132, and various devices 136, 146 attached to I$^2$C buses 138 and 148 coupled together by I$^2$C bridge 140. The host bridge 110 couples to the processors 102, memory 120 and the south bridge 130. The bus 125 (which may be a high speed serial link such as those links proprietary to Intel and ServerWorks or a peripheral component interconnect bus) interconnecting the north and south bridges 110, 130 may have one or more devices such as modems, network interface cards (NICs), and the like attached thereto (none shown in FIG. 1).

As shown, the south bridge 130 preferably includes an I$^2$C bus master slave 136 for permitting south bridge 130 to couple to the I$^2$C bus 138 to which one or more devices 136 are attached. Such devices can be any desired I$^2$C bus-compliant device. Further, although the I$^2$C bus 138 is shown coupled to the south bridge 130, the bus need not be coupled to south bridge 130. For example, the I$^2$C bus 138 may be coupled to the host bridge 110 or other devices in the system. Further, other system architectures besides that shown in FIG. 1 are possible also; the architecture in FIG. 1 is merely exemplary of one suitable embodiment. The salient feature of this disclosure is the bridging together of two I$^2$C buses.

The I$^2$C bus bridge 140 shown in FIG. 1 bridges together the two buses 138 and 148 as shown. For the purpose of explaining the function of the bridge, the bus 138 is referred to as the "A" bus, while the bus 148 is referred to as the "B" bus. Bridge 140 permits a device on the A bus to communicate with a device on the B bus. The communication pathway is bi-directional. That is, a bus A device can become a master in which the target slave device is on the B bus, and vice versa.

In accordance with the preferred embodiment, the bridge 140 detects when a device connected to the A bus asserts one of the bus signals and then drives the corresponding signal on the B bus. Then, if a device on the B bus drives that same signal, the bridge 140 detects this event and responds by driving that same signal on the A bus, even after the original bus A device releases the signal. In other words, the bridge 140 is able to determine which or both sides of the bridge is driving a particular signal.

Figure 2:
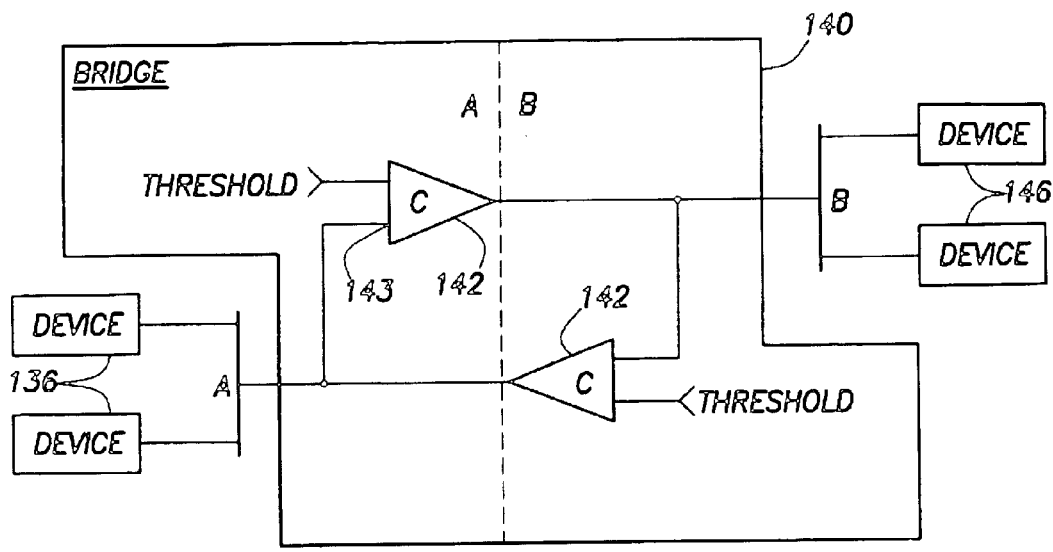
FIG. 2 conceptually illustrates how the bus bridge can distinguish between an external device asserting a signal or the bridge itself asserting the signal.

This concept is illustrated in FIG. 2. The bridge 140 is shown conceptually in FIG. 2 as containing two comparator circuits 142, one for each side (A and B) of the bridge. Each comparator 142 compares the voltage level of a bus signal from the devices attached to one bus to a reference voltage (labeled as "threshold" in FIG. 2). As such, the signals on the A bus are compared to a threshold as are the signals on the B bus. The comparators are "cross coupled" as shown meaning that the output signal of each comparator is coupled to an input of the other comparator and, in fact, coupled to a signal from the other bus. Tracing the schematic from the perspective of the A side of the bridge, the devices 136 are wired together and to an input of the A comparator 142. The output of the B comparator is also connected to A comparator's input and to the A bus signal(s). The threshold level of the A comparator is set so that if either device 136 actively asserts a signal (e.g., drives the signal low), the output signal from the A comparator will be similarly asserted (i.e., driven low), thereby asserting the corresponding signal on the B side of the bridge. If, however, none of the A devices 136 drive the signal low, the signal will remain high and the output of the A comparator will be high on the B side of the bus as well.

Referring still to FIG. 2, if a device 146 on the B side of the bridge drives the signal low when an A device 136 is already driving its corresponding signal low as noted above (i.e., devices on opposite sides of the bridge are driving the same signal low), both comparators 142 will drive their output signals low. The A comparator will drive its output low because one of the A devices is driving the signal low. Similarly, the B comparator, which is coupled to the same signal, will drive its output low because one of the B devices is driving its signal low. Thus, if the A device releases its signal permitting it to become high, the B comparator, which is coupled to the same signal, will keep that signal low because a B device is actively driving the signal low on the B side of the bridge.

Figure 3:
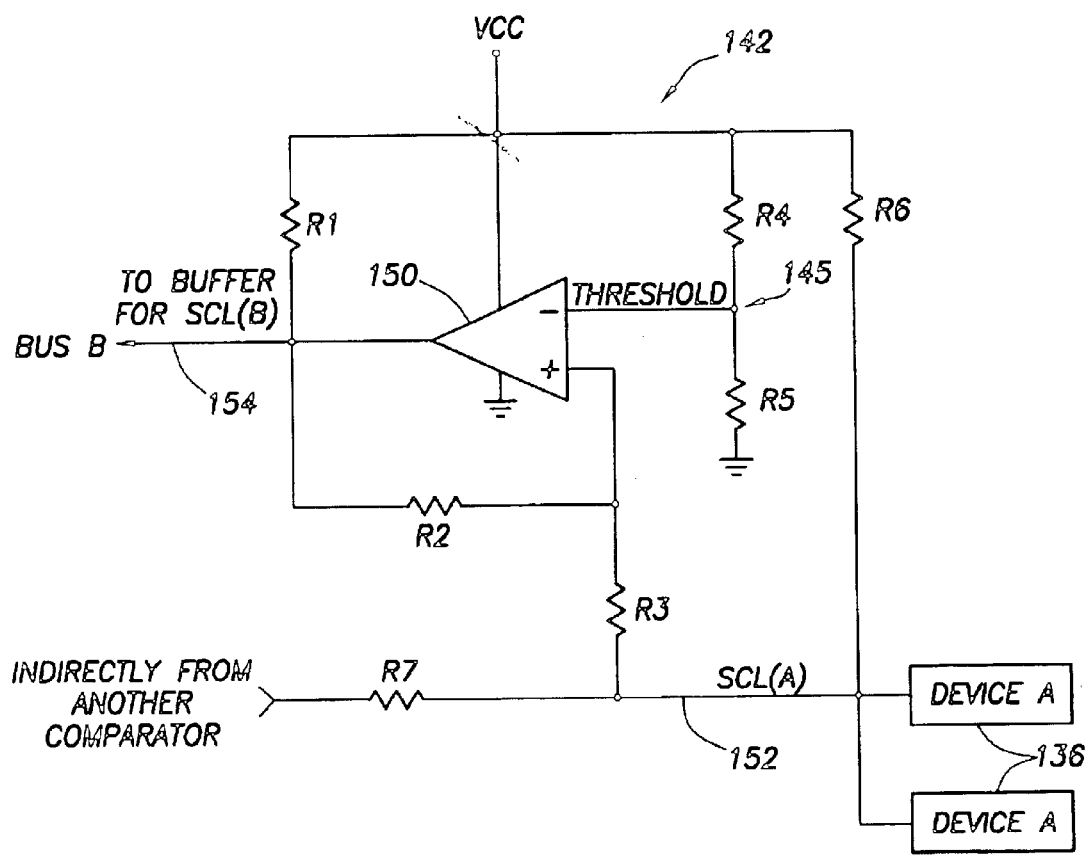
FIG. 3 shows a schematic of a comparator used in the bridge.

As shown in the configuration in FIG. 2, all device 136, 146 are coupled to the inputs of both comparators. The devices 136 on the A side of the bridge are wired directly to the A comparator as shown. The devices 146 on the B side of the bridge are also coupled to the A comparator, albeit via the B comparator. Preferably, the bridge 140 is able to determine which side of the bus is driving a bus signal, or whether devices on both sides of the bus are actively driving the signal. To this end, the bridge 140 is designed so that a different voltage level is generated on the input of a comparator depending on whether a bus device connected to that input asserts the signal or whether the signal is being asserted by a bus device on the other bus via the other comparator. For example, the voltage or input 143 of the A comparator will be at one level if a device 136 asserts the signal and at a second if a device 146 asserts the same signal. One embodiment in which this can be accomplished is shown in FIG. 3, and will be discussed below. The threshold level for both comparators is set at a level that can distinguish between these two voltage levels.

Referring now to FIG. 3, an exemplary embodiment of at least a portion of a comparator circuit 142 which performs the function described above is shown. The circuit is shown to bridge a single bus signal 152 (e.g., the I$^2$C bus clock signal SCL) between devices 136 on the A side of the bridge and the corresponding signal 154 (SCL) on the B side of the bridge. The comparator circuit includes a comparator 150 (e.g., an LM339) and resistors R1–R7. Resistors R4 and R5 comprise a voltage-divider, the mid-point 145 of which represents the threshold voltage which is provided to the inverting input of the comparator 150. The A devices 136 couple to the non-inverting input of the comparator via resistor R3. When a device 136 pulls the SCL(A) signal 152 low, the voltage on the non-inverting input of the comparator 150 will become a voltage within a first voltage range which is less than the threshold value on the inverting input. The comparator 150 responds by forcing its output signal, SCL (B), low through a driver (not specifically shown). Once the SCL(A) signal is released to go high by device 136, the comparator 150 responds by releasing the SCL(B) signal to go high as well. In this manner, the clock signal from the A bus is bridged to the B bus.

The B comparator 142 (FIG. 2) may attempt to drive the A side clock signal low as a result of a bus B device 146 actively forcing the clock signal low. As shown in FIG. 3, the clock signal from the B comparator is also provided to the non-inverting input of the comparator 150 via resistors R7 and R3. Resistor R7 preferably is set at a value such that, when a B bus device drives the clock signal low, the resulting voltage on the non-inverting input of the comparator 150 will be higher than the threshold level, but still at a level that is recognized as a low value on the bus. Thus, when a device on the A side of the bridge pulls the clock signal low, the comparator's non-inverting input will be pulled down to a level in a first voltage range. When a device on the B side of the bus pulls the clock signal low, the comparator's non-inverting input will be pulled down to a level in a second voltage range via the other comparator in the bridge. The threshold level set by voltage-divider R4 and R5 preferably is set between the first and second voltage ranges so that the comparator can distinguish the source of the low signal. Further, if devices on both sides of the bus actively pull the clock signal concurrently, the non-inverting input will be driven to a low level in the first voltage range so that the comparator 150 will drive the bus B clock low even if the bus B device releases the clock signal.

In accordance with one suitable embodiment of the invention, the resistors R1–R7 have the following values as listed in Table I.

TABLE I

Resistor Values

| Resistor | Value (ohms) |
|---|---|
| R1 | 10K |
| R2 | 1M |
| R3 | 20K |
| R4 | 210K |
| R5 | 10K |
| R6 | 4.7K |
| R7 | 470 |

With the exemplary set of values shown in Table I and with a VCC of 3.3 V, the threshold voltage is approximately 150 mV. The devices 136 will be able to pull the SCL(A) down to a value of about 30–40 mV (the first voltage range). With a value of R7 of 470 ohms, the other comparator within the bridge will be able to pull the SCL(A) down to a value of about 300–340 mV (the second voltage range). Thus, the threshold voltage of 150 mV is between these two ranges and thereby permits the bridge to determine the source of a low bus signal.

As explained above, each comparator actively drives a signal on one of the busses only if a device on its input bus is actively driving that signal. There are three conditions that are relevant to the operation of a comparator and each of these three conditions are addressed in the following table. The table examines the action of the comparator 142 from FIG. 2 whose input is taken from the A side of the bridge (bus segment A) and whose output drives the B side of the bridge (bus segment B).

TABLE II

Comparator Action

| Bus segment A state (comparator input) | Comparator input voltage | Bridge action on segment B (comparator output) |
|---|---|---|
| No bus A device is driving bus | 300–340 mV | Comparator does not drive bus B |
| Bus being driven only by a bus A device | 30–40 mV | Comparator does drive bus B |
| Bus being driven by a bus A device and a bus B device | 30–40 mV | Comparator does drive bus B |

Figure 4:
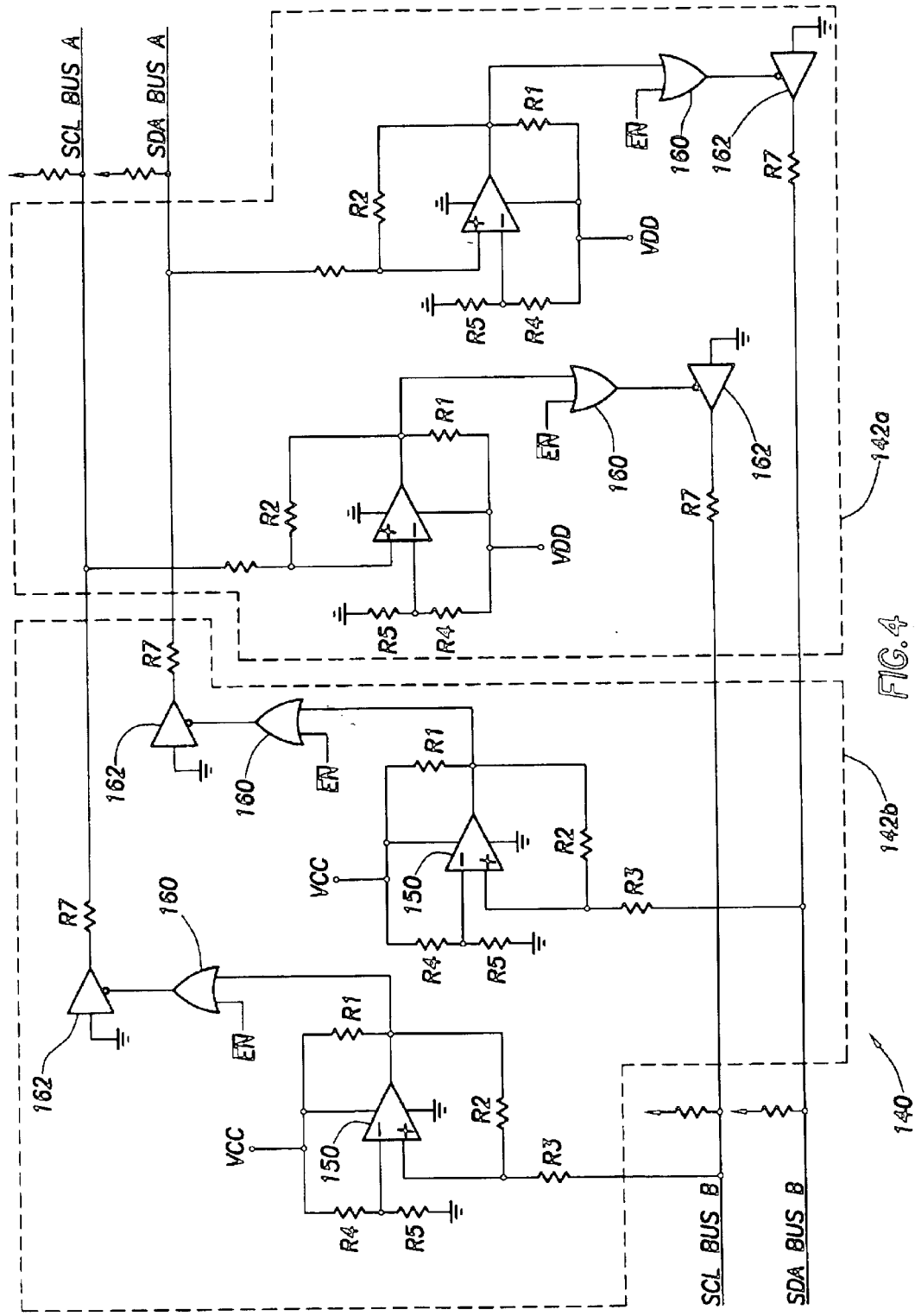
FIG. 4 shows a complete schematic of an I$^2$C-to-I$^2$C bus bridge in accordance with the preferred embodiment of the invention.

Referring now to FIG. 4, a complete schematic of a bus bridge 140 in accordance with the preferred embodiment is shown. The bridge 140 comprises two comparator units 142a and 142b. Comparator unit 142a responds to signals being asserted on the A side of the bridge to drive the corresponding signal on the B side to appropriate levels. Similarly, comparator unit 142b responds to signals being asserted on the B side of the bridge to drive the corresponding signal on the A side to appropriate levels. Each comparator unit 142a, 142b preferably includes a comparator circuit as in FIG. 3. If the buses being bridged together are I$^2$C buses which comprises two signals—a clock signal (SCL) and a data signal (SDA)—each comparator unit preferably includes two comparator circuits, one circuit for each signal.

If it is desired to turn the bridge function on and off, an enable feature can be included within the bridge. One suitable embodiment for such an enablement feature is represented by the OR gates 160 and enabling drivers 162. Each such driver 162 is enabled by its corresponding OR gate whose inputs are the output of a comparator 150 and an enable signal which can be asserted by a device or signal external to the bridge 140. The driver 162 will release the bus interface signal (to float high) if the circuit is disabled (i.e., the enable signal is high) or the output of the comparator reflects that a device on the other bus is no longer driving.

Besides bridging together two buses for the sake of permitting devices on two different buses to be able to communicate with each other, the bridge herein described provides another use. That use is to electrically isolate, as well as bridge together, two buses that operate from different power planes (i.e., different voltage sources). One bus may operate from "auxiliary" power which is always on as long as the computer is connected AC power even if the computer is powered off. Another bus may be powered from a different source within the computer that is on only when the computer is powered on. In this situation—bussed operating from different power sources—the bridge 140 described above can be used, not only simply to bridge the buses together, but also to electrically isolate the buses. As shown in FIG. 4, the power used to operate the comparators which drive the clock and data signals on the A bus is labeled as VCC while the power input to the other comparators which drive the B bus signals is labeled as VDD. By using two different power sources for VCC and VDD, the buses can be electrically isolated.

The above discussion is meant to be illustrative of the principles and various embodiments of the present invention. Although the active state of the I²C bus signals described above is the logic low state, the principles discussed above may be adapted to apply to logic high active states as well. Numerous variations and modifications will become apparent to those skilled in the art once the above disclosure is fully appreciated. It is intended that the following claims be interpreted to embrace all such variations and modifications.

What is claimed is:

1. A computer system, comprising:

a host processor;

an input device coupled to said host processor; and a bridge coupled to said host processor, said bridge couples together a first bus and a second bus;

wherein said bridge drives a signal on the first bus if said signal is being actively driven by a device coupled to the second bus, but not if said signal is only being actively driven by a device coupled to the first bus and wherein said bridge includes a comparator to drive said signal, said comparator has one input coupled to a threshold and another input coupled to the signal from both the first and the second bus.

2. The computer system of claim 1 wherein said threshold is set at a level between the level at which a device on the first bus would cause said signal to be driven to and the level at which a device on the second bus would cause said signal to be driven to.

3. The computer system of claim 1 wherein said bridge includes a comparator for each signal on each of said first and second buses, each comparator used to drive a signal on one of the buses if such signal is being actively driven by a device coupled to the other of said buses, but not if the signal is only being driven by a device coupled to the bus having the signal being driven by the comparator.

4. The computer system of claim 3 wherein the bridge includes a logic gate coupled to each comparator, said logic capable of being disabled by an enable signal to disable the bridging function of the bridge.

5. The computer system of claim 3 wherein said bridge includes a resistor which causes the voltage level of a signal actively driven by a device coupled to the first bus to be different than when that same signal is actively driven by a device coupled to the second bus.

6. The computer system of claim 1 wherein said first and second buses comprise buses on which more than one device can actively and concurrently drive a signal on the buses.

7. The computer system of claim 1 wherein said first and second buses comprise I²C buses.

8. A bridge device coupling together a first bus and a second bus, each bus having a plurality of bus signals that are similar to bus signals found on the other bus and each bus being capable of being coupled to a bus device, comprising:

a plurality of comparators, each of the plurality of comparators having a first input and a second input, a threshold voltage coupled to the first input of each of the plurality of comparators and the second input of each of the plurality of comparators is coupled to a one of the plurality of similar bus signals from both said first and second bus.

9. The bridge device of claim 8 wherein each comparator causes a signal on one of the buses to be driven if that signal is being actively driven by a bus device coupled to the other of said buses, but not if the signal is only being actively driven by a bus device coupled to the bus having the signal being driven by the comparator.

10. The bridge device of claim 8 wherein said threshold voltage of each comparator is set at a level between the level at which a bus device on the first bus would cause said one of the plurality of similar bus signals to be driven to and the level at which a bus device on the second bus would cause said one of the plurality of similar bus signals to be driven to.

11. The bridge device of claim 8 wherein the bridge includes a logic gate coupled to each comparator, said logic gate capable of being disabled by an enable signal to disable the bridging function of the bridge.

12. The bridge device of claim 8 wherein said first and second buses comprise buses on which more than one device can actively and concurrently drive a signal on the buses.

13. The bridge device of claim 8 wherein said first and second buses comprise I²C buses.

14. A method of bridging two buses together, comprising:

(a) comparing the voltage level of a bus signal coupled to both buses to a threshold level;

(b) determining which bus is actively driving said bus signal; and (c) asserting said bus signal on one of the buses if such signal is being actively driven by the other of said buses.

15. The method of claim 14 wherein said buses include a plurality of signals and (a), (b) and (c) are performed for each of said signals.

16. The method of claim 14 wherein said buses comprise I²C buses.

17. A computer system, comprising:

a host processor; and a bridge coupled to said host processor, said bridge couples together a first bus and a second bus, said bridge including a plurality of cross-coupled comparator units that determine whether the first or second bus is actively asserting a bus signal and driving said signal on the other of said first or second buses.

18. A bridge interconnecting two buses including a plurality of cross-coupled comparator units that determine which bus is actively driving a bus signal or whether both buses are actively driving said bus signal.

* * * * *

UNITED STATES PATENT AND TRADEMARK OFFICE
CERTIFICATE OF CORRECTION

PATENT NO. : 6,857,040 B2
APPLICATION NO. : 10/006878
DATED : February 15, 2005
INVENTOR(S) : Robert L. Noonan et al.

Page 1 of 1

It is certified that error appears in the above-identified patent and that said Letters Patent is hereby corrected as shown below:

IN THE CLAIMS

Claim 8, Column 8, line 27, after "coupled to" delete "a"

Signed and Sealed this

Twentieth Day of May, 2008

JON W. DUDAS
*Director of the United States Patent and Trademark Office*